(12) United States Patent
Al-Rubaii

(10) Patent No.: US 12,480,370 B2
(45) Date of Patent: Nov. 25, 2025

(54) DRILLING CONTROL SYSTEM

(71) Applicant: Saudi Arabian Oil Company, Dhahran (SA)

(72) Inventor: Mohammed Murif Al-Rubaii, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 227 days.

(21) Appl. No.: 18/087,292

(22) Filed: Dec. 22, 2022

(65) Prior Publication Data

US 2024/0209700 A1 Jun. 27, 2024

(51) Int. Cl.
*E21B 21/08* (2006.01)
*E21B 44/00* (2006.01)

(52) U.S. Cl.
CPC .............. *E21B 21/08* (2013.01); *E21B 44/00* (2013.01)

(58) Field of Classification Search
CPC ...... E21B 21/08; E21B 21/082; E21B 21/085; E21B 44/00
See application file for complete search history.

(56) References Cited

U.S. PATENT DOCUMENTS

| | | | |
|---|---|---|---|
| 1,428,647 A | 9/1922 | Messenger | |
| 4,844,182 A | 7/1989 | Tolle | |
| 10,221,671 B1 | 3/2019 | Zhang | |
| 10,436,010 B2 | 10/2019 | Wesley et al. | |
| 10,590,761 B1 | 3/2020 | Martinez et al. | |
| 10,781,681 B2 | 9/2020 | Santos et al. | |
| 10,989,046 B2 | 4/2021 | Al-Rubaii et al. | |
| 11,655,690 B2 | 5/2023 | Al-Rubaii et al. | |

(Continued)

FOREIGN PATENT DOCUMENTS

| | | |
|---|---|---|
| CA | 2852765 | 5/2013 |
| CA | 3023860 | 12/2017 |

(Continued)

OTHER PUBLICATIONS

Abdelgawad et al., "New approach to evaluate the equivalent circulating density (ECD) using artificial intelligence techniques," Journal of Petroleum Exploration and Production Technology, Oct. 2018, 10 pages.

(Continued)

*Primary Examiner* — Yanick A Akaragwe
(74) *Attorney, Agent, or Firm* — Fish & Richardson P.C.

(57) ABSTRACT

Disclosed are methods, systems, and computer-readable medium to perform operations including: receiving real-time drilling data of a drilling operation of drilling a wellbore in a formation, the drilling operation performed by a drilling system; calculating, based on the drilling data, a plurality of parameters of the drilling operation, the plurality of parameters comprising: an equivalent circulating density of fluid in the wellbore, a cuttings concentration in an annulus of the wellbore, and a corrected D-exponent; calculating, based on the plurality of parameters, a formation pressure of the formation; based on the formation pressure, determining to perform a corrective action to avoid a potential drilling problem or mitigate an actual drilling problem; and performing the corrective action to avoid the potential drilling problem or mitigate the actual drilling problem.

20 Claims, 5 Drawing Sheets

(56) References Cited

U.S. PATENT DOCUMENTS

| | | | |
|---|---|---|---|
| 2002/0066571 A1* | 6/2002 | Schubert | E21B 21/08 |
| | | | 166/363 |
| 2004/0060738 A1 | 4/2004 | Hemphill | |
| 2005/0126777 A1 | 6/2005 | Rolovic et al. | |
| 2011/0153296 A1 | 6/2011 | Sadlier et al. | |
| 2013/0054146 A1 | 2/2013 | Rasmus | |
| 2013/0085675 A1 | 4/2013 | Prakash et al. | |
| 2013/0292178 A1 | 11/2013 | Burress et al. | |
| 2014/0131104 A1 | 5/2014 | Coley et al. | |
| 2014/0291023 A1 | 10/2014 | Edbury et al. | |
| 2014/0343694 A1 | 11/2014 | Aldred et al. | |
| 2015/0029034 A1 | 1/2015 | Abbassian et al. | |
| 2015/0129306 A1 | 5/2015 | Coffman et al. | |
| 2015/0142318 A1 | 5/2015 | Hildebrand et al. | |
| 2015/0176402 A1 | 6/2015 | Prakash et al. | |
| 2015/0226049 A1 | 8/2015 | Frangos et al. | |
| 2015/0300151 A1 | 10/2015 | Mohaghegh | |
| 2016/0053604 A1 | 2/2016 | Abbassian | |
| 2016/0097270 A1 | 4/2016 | Pobedinski et al. | |
| 2016/0245048 A1 | 8/2016 | Jamison et al. | |
| 2016/0305231 A1* | 10/2016 | Majidi | E21B 49/003 |
| 2016/0369627 A1 | 12/2016 | Kulkarni et al. | |
| 2017/0044896 A1 | 2/2017 | Salminen | |
| 2017/0306724 A1 | 10/2017 | Forstner et al. | |
| 2018/0012384 A1 | 1/2018 | Marland et al. | |
| 2018/0119537 A1 | 5/2018 | Viens et al. | |
| 2018/0328127 A1 | 11/2018 | Ravi et al. | |
| 2019/0055797 A1 | 2/2019 | Astrid et al. | |
| 2019/0316457 A1 | 10/2019 | Al-Rubaii et al. | |
| 2019/0323328 A1 | 10/2019 | Rao et al. | |
| 2019/0330968 A1 | 10/2019 | Boone et al. | |
| 2019/0376385 A1 | 12/2019 | Martinez et al. | |
| 2020/0355059 A1* | 11/2020 | Zhang | E21B 41/00 |
| 2020/0362694 A1 | 11/2020 | Al-Rubaii et al. | |
| 2020/0362695 A1* | 11/2020 | Al-Rubaii | E21B 49/005 |
| 2020/0370381 A1 | 11/2020 | Al-Rubaii et al. | |
| 2020/0371495 A1 | 11/2020 | Al-Rubaii et al. | |
| 2021/0140300 A1 | 5/2021 | Al-Rubaii et al. | |
| 2021/0364336 A1* | 11/2021 | Machocki | G01F 23/686 |

FOREIGN PATENT DOCUMENTS

| | | |
|---|---|---|
| CN | 105626041 | 6/2016 |
| EA | 013694 | 6/2010 |
| IN | 201911040595 | 3/2021 |
| WO | WO 2011130159 | 10/2011 |
| WO | WO 2016034945 | 3/2016 |
| WO | WO 2017027105 | 2/2017 |
| WO | WO 2017209730 | 7/2017 |

OTHER PUBLICATIONS

Agarwal et al., "Real-Time Cleaning of Time-Series Data for a Floating System Digital Twin," OTC-29642-MS, presented at the Offshore Technology Conference held in Houston, Texas, USA, May 2019, 13 pages.

Ahmed et al., "The effect of drillstring rotation on equivalent circulation density: modeling and analysis of field measurements," SPE 135587, SPE Annual Technical Conference and Exhibition, Society of Petroleum Engineers, Sep. 2010, 11 pages.

Aldred et al., "Managing Drilling Risk," Oilfield Review, Summer 1999, 18 pages.

Armenta et al., "Identifying Inefficient Drilling Conditions Using Drilling-Specific Energy," presented at The 2008 Annual Technical Conference and Exhibition Held in Denver, Colorado, Sep. 2008, 16 pages.

Baldino et al., "Cuttings settling and slip velocity evaluation in synthetic drilling fluids," 12th Offshore Mediterranean Conference and Exhibition, Offshore Mediterranean Conference, Ravenna, Italy, Mar. 2015, 15 pages.

Baranthol et al., "Determination of hydrostatic pressure and dynamic ECD by computer models and field measurements on the directional HPHT well 22130C-13," SPE/IADC 29430, SPE/IADC Drilling Conference, Society of Petroleum Engineers, Feb. 28-Mar. 2, 1995, 10 pages.

Contreras et al., "An Innovative Approach for Pore Pressure Prediction and Drilling Optimization in an Abnormally Subpressured Basin," SPE Drill & Compl, 2012, 27:531-545, 15 pages.

drillingformulas.com [online], "Increase in mud weight due to cutting—drilling formulas and drilling calculations," Mar. 2014, retrieved Jul. 18, 2023, retrieved from URL <https://www.drillingformulas.com/increase-in-mud-weight-and-ecd-due-to-cutting/>, 6 pages.

drillingformulas.com [online], "Maximum ROP before fracture formation—drilling formulas and drilling calculations," Mar. 2014, retrieved Jul. 18, 2023, retrieved from URL <https://www.drillingforumulas.com/maximum-rop-before-fracture-formation/>, 7 pages.

Dupriest et al., "Maximizing Drill Rates with Real-Time Surveillance of Mechanical Specific Energy," SPE/IADC Drilling Conference, Society of Petroleum Engineers, 2005, 10 pages.

Elzenary et al., "New technology to evaluate equivalent circulating density while drilling using artificial intelligence," SPE 192282-MS, SPE Kingdom of Saudi Arabia Annual Technical Symposium and Exhibition, Society of Petroleum Engineers, Apr. 2018, 14 pages.

Feng, "The Temperature of Prediction in Deepwater Drilling of Vertical Well," dissertation submitted to the Office of Graduate Studies of Texas A&M University in partial fulfillment of the requirements of the degree of Doctor of Philosophy, May 2011, 146 pages.

Godhavn et al., "Significant Surge and Swab Offshore Brazil Induced by Rig Heave During Drill Pipe Connections," presented at the SPE/IADC Managed Pressure Drilling and Underbalanced Operations Conference and Exhibition, Virtual, Oct. 2020; SPE Drilling & Completion, Sep. 2021, 8 pages.

Guria, "Rheological analysis of drilling fluid using Marsh Funnel," Department of Petroleum Engineering, Indian School of Mines, 2013, 8 pages.

Harris et al., "Evaluation of equivalent circulating density of drilling fluids under high pressure/high temperature conditions," SPE 97018, SPE Annual Technical Conference and Exhibition, Society of Petroleum Engineers, Oct. 2005, 10 pages.

He et al., "Minimizing Cross Flow Among Fractured Stages in Horizontal Wells Using the D-Exponent Calibrated GR Data," Paper presented at the SPE Eastern Regional Meeting, Charleston, West Virginia, USA, Oct. 2019, 14 pages.

Hopkin, "Factors Affecting Cuttings Removal during Rotary Drilling," Journal of Petroleum Technology, Jun. 1967, 19(6), 8 pages.

Luo et al., "Simple Charts to Determine Hole Cleaning Requirements in Deviated Wells," IADC/SPE 27486, SPE/IADC Drilling Conference, Society of Petroleum Engineers, Feb. 1994, 7 pages.

Majidi et al., "Pore-Pressure Estimation by Use of Mechanical Specific Energy and Drilling Efficiency," SPE Drill & Compl, 2017, 32:097-104, 8 pages.

Marsh, "Properties and Treatment of Rotary Mud," Society of Petroleum Engineers, Transactions of the AIME, Dec. 1931, 92(1), 16 pages.

Maurer, "The Perfect Cleaning Theory of Rotary Drilling," Journal of Petroleum Technology, Nov. 1962, 14(11), 5 pages.

Nazari et al., "Review of Cuttings transport in directional well drilling: systematic approach," SPE 132372, SPE Western Regional Meeting, Society of Petroleum Engineers, Anaheim, California, May 2010, 15 pages.

Osman et al., "Determination of drilling mud density change with pressure and temperature made simple and accurate by ANN," SPE 81422, SPE, Society of Petroleum Engineers, Bahrain, Jun. 2003, 12 pages.

Paiaman et al., "Effect of Drilling Fluid Properties on Rate Penetration," NAFTA, Mar. 2009, 60(3), 6 pages.

Pessier et al., "Quantifying Common Drilling Problems with Mechanical Specific Energy and A Bit-Specific Coefficient of Sliding Friction," SPE Annual Technical Conference and Exhibition, Society of Petroleum Engineers, 1992, 16 pages.

(56) References Cited

OTHER PUBLICATIONS

Petrowiki, "Hole Cleaning," available on or before Nov. 22, 2013 via Internet Archive Wayback Machine URL <https://web.archive.org/web/20131122235330/https://petrowiki.spe.org/Hole_cleaning>, retrieved on Jul. 18, 2023 from URL <https://petrowiki.spe.org/Hole_cleaning#:~: text=The%20main%20areas%20of%20concern,there%20is%20limited%20reservoir%20inflow.>, 8 pages.
Rabia et al., "Specific Energy as a Criterion for Bit Selection," Society of Petroleum Engineers, Jul. 1985, 5 pages.
Ranjbar, "Cutting Transport in Inclined and Horizontal Wellbore," University of Stavanger, Faculty of Science and Technology, Master's Thesis, Jul. 2010, 137 pages.
Rasi, "Hold Cleaning in Large, High-Angle Wellbores," SPE/IADC Drilling Conference, Society of Petroleum Engineers, Feb. 1994, 12 pages.
Robinson et al., "Effect of Hole Cleaning on Drilling Rate Performance," Paper Aade-04-Df-Ho-42, AADE 2004 Drilling Fluids Conference, Houston, Texas, Apr. 2004, 7 pages.
Robinson, "Economic Consequences of Poor Solids and Control," AADE 2006 Fluids Conference and Houston, Texas, Apr. 2006, 9 pages.
Rubaii et al., "A New Robust Approach for Hole Cleaning to Improve Rate of Penetration," SPE Kingdom of Saudi Arabia Annual Technical Symposium and Exhibition. Society of Petroleum Engineers, Aug. 2018, 40 pages.
Saasen et al., "Automatic measurement of drilling fluid and drill-cutting properties," SPE 112687, presented at the SPE Drilling Conference, Orlando, Florida, Mar. 2008; SPE Drilling and Completion, Dec. 2009, 15 pages.
Saini et al., "Predictive Action Planning for Hole Cleaning Optimization and Stuck PipePrevention Using Digital Twinning and Reinforcement Learning," IADC/SPE—199548-MS, Society of Petroleum Engineers, presented at the IADC/SPE International Drilling Conference and Exhibition held in Galveston, Texas, Mar. 2020, 18 pages.
Samuel et al., "Field Validation of Transient Swab-Surge Response With Real-Time Downhole Pressure Data," SPE Drill & Completion, 2003, 18:280-283, 4 pages.
Sifferman et al., "Drilling cutting transport in full scale vertical annuli," Journal of Petroleum Technology 26.11, 48th Annual Fall Meeting of the Society of Petroleum Engineers of AIME, Las Vegas, Sept. 30-Oct. 3, 1973, 12 pages.
Teale et al., "The Concept of Specific Energy in Rock Drilling," International Journal of Rock Mechanics and Mining Sciences, 1965, 2:57-73, 17 pages.
Tobenna, "Hole Cleaning Hydraulics," University of Stavanger, Faculty of Science and Technology, Master's Thesis, Jun. 15, 2010, 75 pages.
Wastu et al., "The effect of drilling mud on hole cleaning in oil and gas industry," Journal of Physics: Conference Series, Dec. 2019, 1402(2), 7 pages.
Williams et al., "Carrying Capacity of Drilling Muds," Journal of Petroleum Technology, Apr. 1951, vol. 192, 10 pages.
Xia et al., "A Cutting Concentration Model of a Vertical Wellbore Annulus in Deep-water Drilling Operation and its Application," Applied Mechanics and Materials, Sep. 2011, 101/102, 5 pages.
Zhou et al., "Mechanical specific energy versus depth of cut," 46th US Rock Mechanics/Geomechanics Symposium, American Rock Mechanics Association, ARMA 12-622, Chicago, Illinois, Jun. 2012, 6 pages.

* cited by examiner

DRILLING CONTROL SYSTEM

TECHNICAL FIELD

This disclosure relates to methods and systems for implementing a drilling control system.

BACKGROUND

In wellbore drilling operations, a drilling system causes a drill bit to rotate when in contact with a formation. The rotation of the drill bit breaks and fractures the formation to form the wellbore. The portions of the formation that are broken off during drilling are referred to as "formation cuttings." In order to remove the cuttings from the wellbore, the drilling system circulates a drilling fluid (also referred to as "drilling mud" or "mud") to the drill bit. The drilling fluid exits through drill bit nozzles to the bottom of the wellbore. The drilling fluid carries the formation cuttings from the wellbore to the surface. The ability of the drilling fluid to carry the formation cuttings out of the wellbore is referred to as a carrying capacity of the drilling fluid.

SUMMARY

The present disclosure describes methods and systems, including computer-implemented methods, computer program products, and computer systems for operating a drilling system. Aspects of the subject matter described in this specification may be embodied in methods that include: receiving real-time drilling data of a drilling operation of drilling a wellbore in a formation, the drilling operation performed by a drilling system; calculating, based on the drilling data, a plurality of parameters of the drilling operation, the plurality of parameters comprising: an equivalent circulating density of fluid in the wellbore, a cuttings concentration in an annulus of the wellbore, and a corrected D-exponent; calculating, based on the plurality of parameters, a formation pressure of the formation; based on the formation pressure, determining to perform a corrective action to avoid a potential drilling problem or mitigate an actual drilling problem; and performing the corrective action to avoid the potential drilling problem or mitigate the actual drilling problem.

The previously described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, determining to perform a corrective action to avoid a potential drilling problem or mitigate a detected drilling problem involves detecting the potential drilling problem or the actual drilling problem based on the formation pressure.

In some implementations, detecting the potential drilling problem or the actual drilling problem based on the formation pressure involves: calculating, based on the formation pressure, a mud level drop in the annulus; and determining that the calculated mud level drop is indicative of the potential drilling problem or the actual drilling problem.

In some implementations, performing the corrective action to avoid the potential drilling problem or mitigate the actual drilling problem involves controlling the drilling system to adjust one or more drilling parameters to avoid the potential drilling problem or mitigate the actual drilling problem.

In some implementations, the drilling parameters include: a rate of penetration (ROP) of a drilling tool of the drilling system, a hole size of the wellbore, and a flow rate (GPM) of a drilling fluid.

In some implementations, performing the corrective action to avoid the potential drilling problem or mitigate the actual drilling problem involves calculating, based on the formation pressure, a preferred mud weight; and controlling a mud system to adjust a mud weight to the preferred mud weight.

In some implementations, performing the corrective action to avoid the potential drilling problem or mitigate the actual drilling problem involves displaying, via a graphical user interface (GUI), drilling instructions to perform one or more actions to avoid the potential drilling problem or mitigate the actual drilling problem.

In some implementations, performing the corrective action to avoid the potential drilling problem or mitigate the actual drilling problem involves: calculating, based on the formation pressure, a preferred kill mud amount to avoid the potential drilling problem or mitigate the actual drilling problem; and controlling a mud system to pump at least the preferred kill mud amount into the annulus.

In some implementations, the plurality of parameters further include: an original D-Exponent and an effective mud weight The details of one or more implementations of the subject matter described in this disclosure are set forth in the accompanying drawings and the description. Other features, aspects, and advantages of the subject matter will become apparent from the description, the drawings, and the claims.

DETAILED DESCRIPTION

Figure 1:
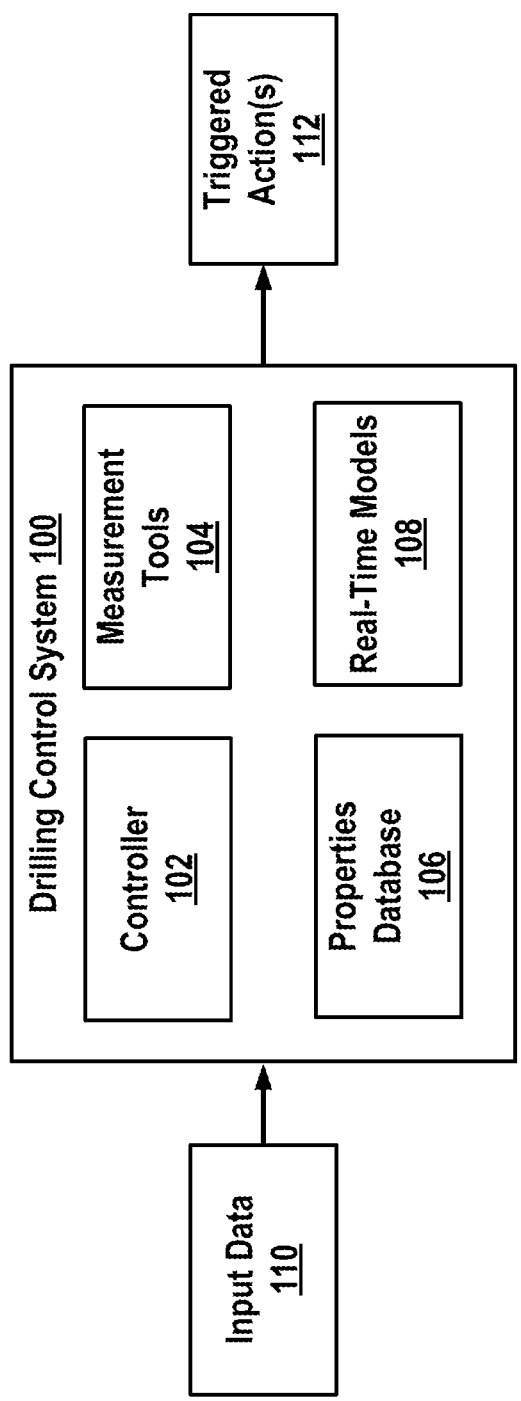
FIG. 1 illustrates an example drilling control system, according to some implementations of the present disclosure.

This disclosure describes methods and systems for controlling a drilling system based on formation pressure. As explained in more detail below, a drilling control system develops real-time models of a drilling operation performed by the drilling system. The real-time models are based on data mining and physical modelling techniques. For example, the real-time models are based on surface rig sensor measurements and mud rheological properties. The real-time models enable interpretation of downhole measurements and conditions. For example, the real-time models are used to monitor and evaluate formation pressure. The real-time models use real-time equations that enable real-time evaluation of drilling factors, such as an enhanced D-Exponent and formation pressure.

The drilling control system uses the real-time models to enhance well drilling and rig performance through real-time monitoring of formation pressure during drilling operations. Among other things, the models enable a drilling team to continuously monitor, evaluate, and control formation pressure, drilling fluid density, and equivalent drilling density. Doing so optimizes well drilling and rig performance, e.g., by reducing non-rotating time of the drilling system. Further, the models enable safe and optimal drilling, which ensures smooth drilling and rig efficiency. The real-time monitoring, evaluation, and optimization also helps mitigate hole problems and improves drilling rig performance resulting in safer, more economical, and more environmental wells. Furthermore, monitoring and evaluating formation pressure provides evaluation of rock formation physical properties, drilling rate, rate of penetration (ROP) and speed of drilling. Based on the evaluation, the drilling control system can control drilling operations to ensure optimum performance for rig and drilling efficiency, and to mitigate drilling troubles associated with stuck pipe incidents and excessive drilling costs.

In some implementations, monitoring and evaluating formation pressure can be used to evaluate the rock formation physical properties. By obtaining the formation pressure, other physical rock properties, such as formation porosity, formation permeability, formation resistivity, formation bulk density, formation grain or matrix density, formation compressive strength and formation fracture pressure can be calculated and evaluated. Formation pressure is the main function of other physical rock properties and is strongly related to the listed physical rock properties. As an example, formation pressure can be converted to formation fluid density. The formation fluid density can be used with bulk density and matrix density to calculate formation fluid density. Then, using petro-physical fundamental equations, physical rock properties such as porosity, permeability, and others can be calculated. As illustrated by this example, formation pore pressure can be used to derive other parameters.

For the purposes of this disclosure, the terms "real-time," "real time," "realtime," or similar terms (as understood by one of ordinary skill in the art) mean that an action and a response are temporally proximate such that an individual perceives the action and the response occurring substantially simultaneously. For example, the time difference for a response to display (or for an initiation of a display) of data following the action of an individual to access the data may be less than 1 millisecond (ms), less than 1 second, or less than 5 seconds. While the requested data need not be displayed (or initiated for display) instantaneously, it is displayed (or initiated for display) without any intentional delay, taking into account processing limitations of a described computing system and time required to, for example, gather, accurately measure, analyze, process, store, and/or transmit the data.

FIG. 1 illustrates an example drilling control system 100, according to some implementations. In one embodiment, the drilling control system 100 is implemented using a computer system, such as the computer system 400 of FIG. 4. As described in FIG. 4, the computer system 400 can communicate with one or more other computer systems over one or more networks. Note that the drilling control system 100 is shown for illustration purposes only, as the drilling control system 100 can include additional components or have one or more components removed without departing from the scope of the disclosure. Further, note that the various components of the drilling control system 100 can be arranged or connected in any manner.

In some embodiments, the drilling control system 100 is a computer-based system that is configured to monitor a drilling operation, provide drilling recommendations to operators, and control a drilling system performing the drilling operation. More specifically, the drilling control system 100 is configured to monitor and evaluate formation pressure during the drilling operation. As described in more detail below, monitoring and evaluating the formation pressure enables the drilling control system 100 to improve the drilling operation, for example, by proactively avoiding drilling problems or reactively mitigating a detected drilling problem.

In one example, the drilling control system 100 is configured to generate recommendations that improve the drilling operation. The drilling control system 100 can provide drilling teams (or operators) with the recommendations, perhaps, by displaying the recommendation on a user device display or by providing a user notification (for example, an audible, visual, or tactile alert). Additionally or alternatively, the drilling control system 100 can take actions based on the formation pressure or the generated recommendations, such as corrective actions that mitigate detected drilling problems, actions that proactively improve the drilling operation, or both.

FIG. 1 illustrates a drilling control system 100, according to some implementations. As shown in FIG. 1, the drilling control system 100 includes a controller 102, measurement tools 104, a properties database 106, and real-time models 108. The drilling control system 100 is configured to generate the real-time models 108 of a drilling operation. The real-time models 108 are algorithmic-based models that characterize the properties and operation of a drilling operation (e.g., performed using the drilling system 500 of FIG. 5). The drilling control system 100 is configured to use the real-time models 108 to monitor and evaluate the drilling operation. For example, the drilling control system 100 can use the real-time models 108 to monitor and evaluate a formation pressure of the formation in which the drilling operation is occurring. Further, the drilling control system 100 is configured to perform one or more triggered action(s) 112 based on the real-time models 108. The trigged actions 112 are also referred to herein as corrective actions. For example, the drilling control system 100 can adjust a mud weight based on the real-time models 108.

In some implementations, the measurement tools 104 include rig sensors, such as surface rig sensors and other devices that are configured for real-time surface and down-wellbore measurements. Examples of the rig sensor data include measurement-while-drilling (MWD) data, logging-while-drilling (LWD) data, drilling rate, rate of penetration (ROP), torque (that is, the movement required to rotate the drilling pipe), spindle speed (that is, the rotation frequency of the spindle of the drilling system, measured in RPM), weight on bit (that is, the amount of downward force exerted on the drilling bit provided by the thick-walled tubular pieces in the drilling assembly), and standard pipe pressure (that is the summation of pressure loss in annulus, pressure loss in drill string, pressure loss in bottom hole assembly (BHA) and pressure loss across the bit), mudflow volume, mud pressure, mud resistivity, gas readings, among other examples. Examples of the mud or drilling fluid properties includes drilling fluid density, viscosity, yield point, gel strength, filtration, and rheology. Other examples of the drilling data include a hole size of the borehole and dimensions of the drill pipe.

In some implementations, the controller 102 determines input data 110. Determining the input data 110 involves controlling the measurement tools 104 to measure or receive input data 110. Determining the input data 110 also involves retrieving relevant data stored in the properties database 106. As described in more detail below, the controller 102 uses the input data 110 to generate the real-time models 108. Further, the controller 102 monitors drilling parameters provided by the real-time models 108. For example, the controller 102 monitors the formation pressure. In some examples, monitoring the real-time models 108 triggers the controller 102 to perform one or more triggered actions 112. For example, the controller 102 determining that a monitored parameter deviates from a predetermined threshold triggers the controller 102 to perform a particular action.

In some implementations, the input data 110 includes mechanical drilling parameters, rheological mud properties, and hydraulics of drilling bit. Table 1 lists some examples of mechanical drilling parameters, Table 2 lists some examples of rheological drilling fluid parameters, and Table 3 lists some examples of hydraulic drilling parameters.

TABLE 1

Mechanical Drilling Parameters

| Terms | Parameters | Acronyms | Unit |
| --- | --- | --- | --- |
| Pumping Rate of Mud | Drilling | GPM | gallons/minute (gal/min) |
| Rate Of Penetration | Drilling | ROP | feet/hour (ft/hr) |
| Weight on Bit | Drilling | WOB | pounds (lbs) |
| Bit Size | Drilling | OH | inches (in) |
| Drill string Rotation | Drilling | RPM | revolutions/min (rev/min) |
| Standpipe Pressure | Drilling | SPP | pound per square inch (psi) |
| Torque | Drilling | TOR | kilopound-ft (klb-ft) |
| Diameter of Drill Pipe | Drilling | DP | in |

TABLE 2

Rheological Drilling Fluid Parameters

| Terms | Parameters | Acronyms | Units |
| --- | --- | --- | --- |
| Plastic Viscosity | Rheology | PV | centipoises (CP) |
| Yield point | Rheology | YP | CP |
| Mud Weight | Rheology | MW | pound cubic feet (PCF) |
| Marsh funnel Viscosity | Rheology | MF | seconds (s) |

TABLE 3

Hydraulic Drilling Parameters

| Terms | Parameters | Acronyms | Units |
| --- | --- | --- | --- |
| Bit flow area | Hydraulic | TFA | in^2 |
| Bit pressure loss | Hydraulic | BPL | psi |
| Jet Impact force | Hydraulic | JIF | lbs |

In some implementations, the controller 102 develops the real-time models 108 using a real-time data driven approach. The controller 102 develops the real-time models 108 by collecting production data and developing the models based on the data. In particular, the real-time models 108 are based on data mining and physical model techniques that are applied to generate real-time profiles for rock formation pressure. The real-time models 108 enable monitoring, evaluating, and controlling drilling systems for efficiency. Additionally, the real-time models 108 improve drilling operations by reducing drilling time, reducing non-rotating time, mitigating hole problems, and optimizing well drilling and rig performance. The real-time models 108 enable immediate intervention by the drilling control system 100 when the wellbore drilling performance is not sufficiently efficient (e.g., compared to a predetermined threshold). Additionally, the real-time models 108 provide insights related to drilling formation effectiveness. In sum, the real-time models 108 provide an enhanced evaluation of pressure (e.g., formation pressure, sand-face pressure, or pore pressure) while drilling.

As an example, formation pressure and formation fracture pressure can be calculated using the models 108. The, the drilling fluid or mud density can be controlled based on the formation pressure and formation fracture pressure, perhaps to be optimized within a drilling window. A drilling window is the formation and fracture pressures limits. In particular, the controller 102 can control the drilling operations such that the drilling fluid density is greater than a formation pressure and below a formation fracture pressure. For example, the rate of penetration (ROP) can be optimized by drilling with suitable overbalance above formation pressure and drilling fast with cuttings plus mud density below fracture pressure limit.

In some implementations, the real-time models 108 are based on calculations of cuttings concentration, effective mud weight, equivalent circulating density, D-exponent, and modified D-exponent. Table 4 lists calculated drilling parameters, hydraulic parameters, and hole cleaning indicators.

TABLE 4

Calculated Parameters and Indicators

| Terms | Parameters | Acronyms | Units |
| --- | --- | --- | --- |
| Equivalent Circulating Density | Hydraulic | ECD | PCF |
| Effective Mud Weight | Hydraulic | EMW | PCF |
| Cutting Concentration in Annulus | Hole Cleaning Indicator | CCA | unitless |
| Original D-Exponent | Drilling | ODE | unitless |
| Corrected D-Exponent | Drilling | CDE | unitless |

In some implementations, the controller 102 uses the real-time models 108 to evaluate and monitor formation pressure. Doing so also allows the controller 102 to evaluate drilling parameters, including rock formation physical properties, drilling rate, rate of penetration, and speed of drilling. Evaluation of these parameters can be used to ensure optimum performance for rig and drilling efficiency. Further, it mitigates drilling troubles associated with stuck pipe incidents and excessive drilling costs. In turn, the drilling control system 100 can minimize non-rotating time, maximize the rate of penetration, and hole cleaning efficiency by optimizing mechanical drilling parameters, rheological, chemical, and physical drilling fluids properties. For example, the controller 102 can determine an optimized ROP in conjunction with a minimized non-drilling time, which yields real-time profiles of rock formation pressures values integrated with developed well control models. This reduces the drilled cost per foot and minimize well control risks.

In some implementations, the drilling control system 100's automated evaluation of formation pressures of rocks meets the requirements of the fourth industrial revolution (4IR) as a digital twin (bridging between physics and data), and can be used to ensure optimized well design such as casing design, drilling string design, mud window, bit selection, and improved well drilling performance. For optimized production, the drilling control system 100 can enhance flow rate, reduce sand production, decrease drawdown pressure, reduce washout length of propagation of proponent fluid and hydraulic fracturing, and reduce hole section washout.

In existing systems, wireline logging operations acquire data while performing drilling operations to estimate fracture pressure and formation fluid content. Automated formation rock pressure while drilling can minimize usage of these logging operations and running certain tools such as pressures while drilling (PWD) and formation tester tools (FTT). That will lead to saved time and costs to deliver wells ahead of time efficiently and safely.

In some implementations, the controller 102 controls the mud weight, perhaps by detecting and responding to a mud level drop in the annulus while drilling (e.g., in the case of lost circulation incident). For example, the controller 102 can respond to a mud level drop by pumping a required kill mud weight to control the well while drilling or by pumping the required kill mud weight through an emergency kill line of the rig.

In some implementations, the CCA and ROP are directly related to the effective mud weight while drilling. The drilling rate or rate penetration is directly related to a calculated ECD, which is calculated based on effective and mud properties such as plastic viscosity (PV) and yield point (YP) and other rheological parameters. Generally, ECD will increase as ROP increases due to more drilling cuttings generation while drilling and added amount of cuttings in drilling fluid weight. The rate of penetration, D-exponent, and modified D-exponent can be used to extrapolate information related to fluid density of drilled formation. The D-exponents can be used to extrapolate drilling parameters behaviors across a drilled formation, such as identifying depleted, geo-pressured, and normal zones. In some examples, the drilling control system 100 uses a bulk density model to ensure optimized automated evaluation processes of formation pressure while drilling. The bulk density model can be generated based on surface drilling fluid properties and drilling parameters.

The decisions that the drilling control system 100 can perform include (i) evaluating drilled formation zone (e.g., depleted, geo-pressure, or normal) based on drilling D-exponents; (ii) formation pressure; (iii) mud weight; (iv) detecting and responding to mud level drop in the annulus (e.g., due to lost circulation incidents); (v) minimizing or eliminating logging runs; (vi) determining the required kill mud weight amount to be pumped in annulus. Table 5 lists the outputs that are calculated based on the real-time models 108.

TABLE 5

| Calculated Outputs | | | |
|---|---|---|---|
| Terms | Parameters | Acronyms | Units |
| Calculated formation pressure | Rock | CFP | psi |
| Formation pressure from logging tool | Rock | FP | psi |
| Mud level drop | hydraulic | MLD | ft |
| Required kill mud | hydraulic | RKM | barrel (bbl) |

TABLE 5-continued

| Calculated Outputs | | | |
|---|---|---|---|
| Terms | Parameters | Acronyms | Units |
| Calculated required kill mud | hydraulic | CRKM | bbl |
| Calculated mud level drop | hydraulic | CMLD | ft |

Figure 2:
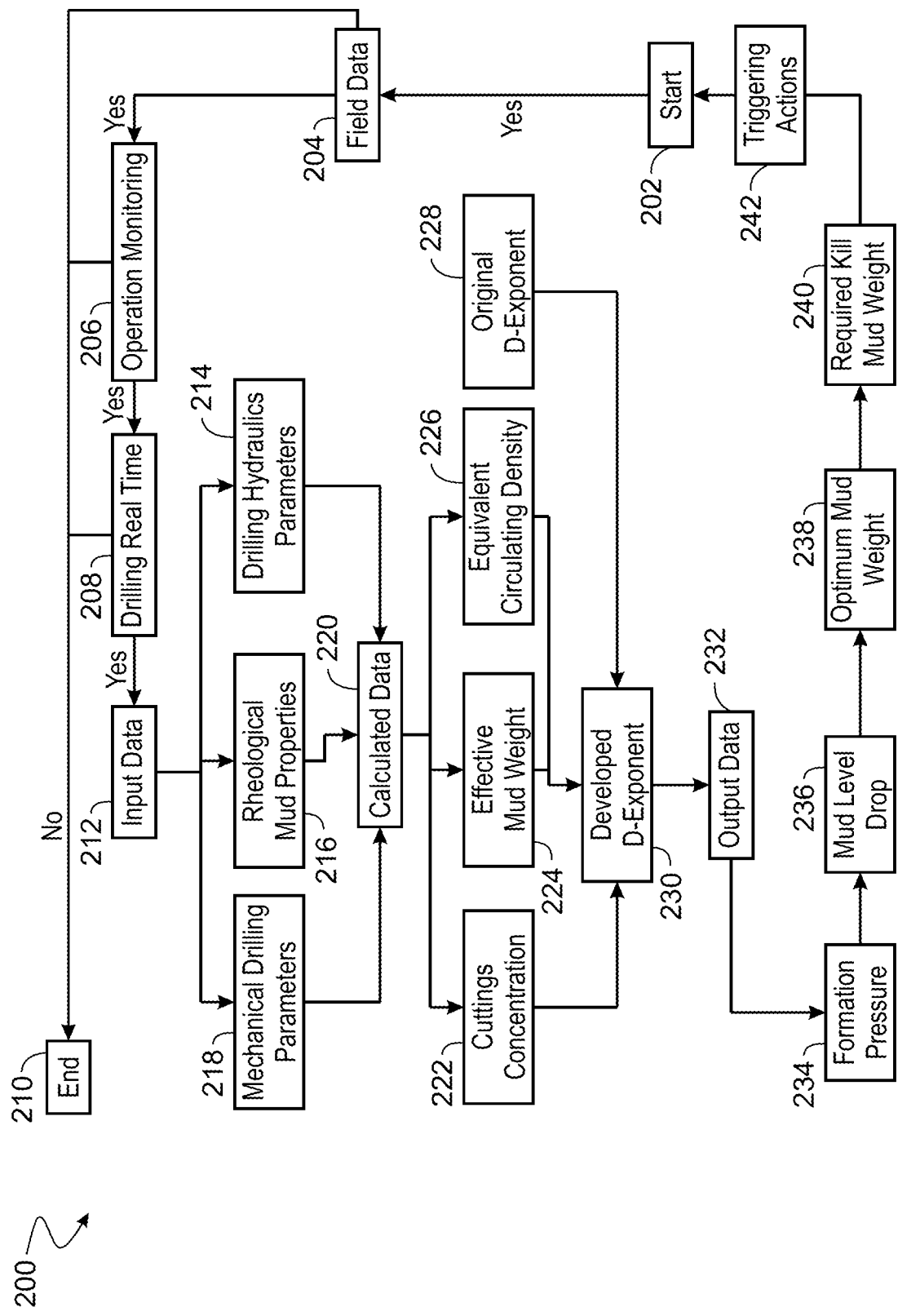
FIG. 2 illustrates an example workflow for controlling a drilling operation, according to some implementations of the present disclosure.

FIG. 2 illustrates a workflow 200 for controlling a drilling operation, according to some implementations. The workflow 200 can be implemented by the drilling control system 100 of FIG. 2. In an example, the drilling control system 100 implements the workflow 200 during a drilling operation of drilling one or more wells.

The workflow starts at step 202. At step 204, the drilling control system 100 determines whether field data is available. If field data is available, the drilling control system 100 measures and/or receives the field data, and moves to step 206. At step 206, the drilling control system 100 determines whether drilling operation monitoring is configured for the present drilling operation. If operation monitoring is configured, the drilling control system 100 moves to step 208. At step 208, the drilling control system 100 determines whether drilling is occurring in real-time. If so, the drilling control system 100 moves to step 212. Note that if the drilling control system 100 determines that the answer is "no," at steps 204, 206, or 208, then the drilling control system 100 moves to step 210 where the workflow 200 ends.

At step 212, the drilling control system 100 receives input data (e.g., input data 110). In particular, at step 214, the drilling control system 100 determines drilling hydraulics parameters, at step 216, determines rheological mud properties, and at step 218, determines mechanical drilling parameters. At step 220, the drilling control system 100 calculates one or more drilling parameters and indicators based on the input data. At step 222, the drilling control system 100 calculates the cutting concentrations in the annulus of the wellbore (CCA). In an example, the drilling control system 100 uses Equation [1] to calculate the CCA:

$$CCA = 0.0014 \frac{ROP(OH^2)}{GPM}. \quad [1]$$

At step 224, the drilling control system 100 calculates an effective mud weight. In an example, the drilling control system 100 uses Equation [2] to calculate the effective mud weight:

$$EMW(PCF) = (CCA * MW + MW) \quad [2]$$

At step 226, the drilling control system 100 calculates an equivalent circulating density. In an example, the drilling control system 100 uses Equation [3] to calculate the equivalent circulating density:

$$ECD = \\ EMW + 7.481 \left[ \frac{0.1}{(OH-DP)} \times \left( YP + \frac{0.5(PV + 0.0159 * EMW(MF - 28)) \times \left( 24.5 \frac{GPM * CCA + GPM)}{OH^2 - OD^2} \right)}{300 \times (OH - DP)(0.007 * Depth)} \right) \right] \quad [3]$$

In Equation [3], depth is the drilling measured depth (which accounts for the influence of friction pressure loss in horizontal section) and OD is the drill pipe outer diameter in inches (which accounts for hydraulic diameter effect).

At step 228, the drilling control system 100 calculates an original D-exponent (ODE). In an example, the drilling control system 100 calculates the original D-exponent using Equation [4]:

$$ODE = \frac{\log\left(\frac{ROP}{60\ RPM}\right)}{\log\left(\frac{12WOB*1000}{1000000\ OH}\right)}. \quad [4]$$

At step 230, the drilling control system 100 calculates a corrected D-exponent (CDE). In an example, the drilling control system 100 calculates the corrected D-exponent using Equation [5]:

$$CDE = \left(\left(\frac{\log\left(\left(\frac{ROP}{60\ RPM}\right)\left(\frac{SPP+GPM}{SPP-GPM}\right)\right)}{\log\left(\left(\frac{12000\ WOB}{1000000\ OH}\right)\left(\frac{1000TOR + \frac{0.00663(GPM^2 EMW)}{285\ TFA}}{1000TOR - \frac{0.00663(GPM^2 EMW)}{285\ TFA}}\right)\right)}\right)\left(\frac{ECD}{EMW}\right)\right). \quad [5]$$

The drilling control system 100 then moves to step 232 of calculating output data. More specifically, at step 234, the drilling control system 100 calculates formation pressure. In an example, the drilling control system 100 calculates the formation pressure using Equation [6] if it assumed that there are no losses and designed drilling mud weight is used. In another example, the drilling control system 100 calculates the formation pressure using Equation [7] if the drilling mud weight is increased compared to the designed drilling mud weight.

$$CFP = 0.5\left(\left(\text{Depth} - (\text{Depth} - (0.007\ EMW\ \text{Depth}))\left(\frac{CDE}{ODE}\right)^{1.2}\right) + \left(\text{Depth} - (\text{Depth} - (0.007\ EMW\ \text{Depth}) - OB)\left(\frac{CDE}{ODE}\right)^{1.2}\right)\right). \quad [6]$$

$$CFP = 0.3\left(\left(\text{Depth} - (\text{Depth} - (0.007\ EMW\ \text{Depth}))\left(\frac{CDE}{ODE}\right)^{1.2}\right) + \left(\text{Depth} - (\text{Depth} - (0.007\ EMW\ \text{Depth}) + OB)\left(\frac{CDE}{ODE}\right)^{1.2}\right) + 0.441\ \text{Depth}\left(\frac{CDE}{ODE}\right)\right). \quad [7]$$

At step 236, the drilling control system 100 calculates a mud level drop. Evaluating mud drop level in annulus while drilling allows the drilling control system 100 to determine with optimum mud weight to minimize drilling problems. In an example, the drilling control system 100 uses Equation [8] to calculate the mud level drop:

$$CMLD(\text{ft}) = \frac{CFP}{0.007\ EMW}. \quad [8]$$

At step 238, the drilling control system 100 calculates an optimum mud weight. The optimum mud weight can be controlled by adjusting the used drilling fluid density to balance well based on the calculated formation pressure, while drilling with suitable overbalance based on drilling scenarios (e.g., water, oil, or gas well). And with allowing drilling cuttings generated while drilling to be maximum 5% cutting concentration in annulus, and finally, to control ROP to be within drilling window and below fracture pressure limit. In other words, by using the calculated formation pressure from developed real time models, overbalance, cuttings concentration in annulus percentage to be a certain threshold (e.g., 5%), and controlling ROP to generate cuttings maximum and maintain drilling fluid density to be below formation fracture pressure.

At step 240, the drilling control system 100 calculates a required kill mud amount. The calculated required kill mud or mud cap amount is used to balance well and pumped in the annulus. Doing so allows the drilling control system 100 to recompense from mud hydrostatic column in annulus due to losses. In an example, the drilling control system 100 uses Equation [9] to calculate the required kill mud:

$$CRKM\ (\text{bbl}) = CMLD\left(\left(\frac{OH^2 - OD^2}{1029.4}\right) + \left(\frac{Last\ CSG\ ID^2 - OD^2}{1029.4}\right)\right). \quad [9]$$

At step 242, the drilling control system 100 performs one or more triggering actions. The triggered actions include pumping an amount of mud level in annulus to balance the well during lost circulation, determining a kill mud weight since the formation pressure is obtained and the well can be balanced, calculating the optimum mud density for resuming drilling smoothly.

Figure 3:
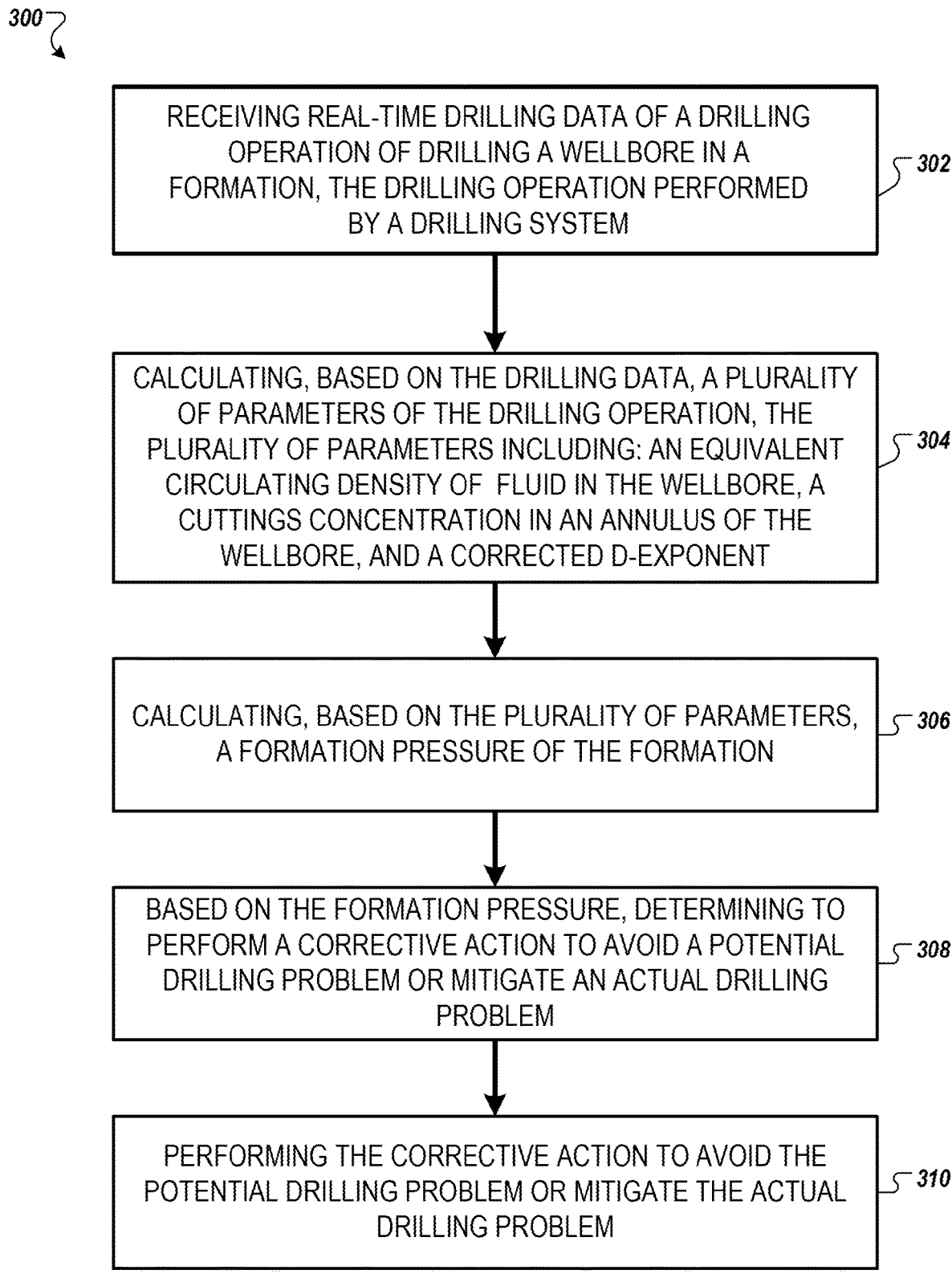
FIG. 3 illustrates a flowchart of an example method, according to some implementations of the present disclosure.

FIG. 3 is a flowchart of an example method 300, according to some implementations. The method 300 is for controlling a drilling operation. For clarity of presentation, the description that follows generally describes method 300 in the context of the other figures in this description. However, it will be understood that method 300 can be performed, for example, by any suitable system, environment, software, hardware, or a combination of systems, environments, software, and hardware, as appropriate. In some implementations, various steps of method 300 can be run in parallel, in combination, in loops, or in any order.

At step 302, method 300 involves receiving real-time drilling data of a drilling operation of drilling a wellbore in a formation, the drilling operation performed by a drilling system.

At step 304, method 300 involves calculating, based on the drilling data, a plurality of parameters of the drilling operation, the plurality of parameters including: an equivalent circulating density of fluid in the wellbore, a cuttings concentration in an annulus of the wellbore, and a corrected D-exponent.

At step 306, method 300 involves calculating, based on the plurality of parameters, a formation pressure of the formation.

At step 308, method 300 involves based on the formation pressure, determining to perform a corrective action to avoid a potential drilling problem or mitigate an actual drilling problem.

At step 310, method 300 involves performing the corrective action to avoid the potential drilling problem or mitigate the actual drilling problem.

In some implementations, determining to perform a corrective action to avoid a potential drilling problem or mitigate a detected drilling problem involves detecting the potential drilling problem or the actual drilling problem based on the formation pressure.

In some implementations, detecting the potential drilling problem or the actual drilling problem based on the formation pressure involves: calculating, based on the formation pressure, a mud level drop in the annulus; and determining that the calculated mud level drop is indicative of the potential drilling problem or the actual drilling problem.

In some implementations, performing the corrective action to avoid the potential drilling problem or mitigate the actual drilling problem involves: controlling the drilling system to adjust one or more drilling parameters to avoid the potential drilling problem or mitigate the actual drilling problem.

In some implementations, the drilling parameters include: a rate of penetration (ROP) of a drilling tool of the drilling system, a hole size of the wellbore, and a flow rate (GPM) of a drilling fluid.

In some implementations, performing the corrective action to avoid the potential drilling problem or mitigate the actual drilling problem involves: calculating, based on the formation pressure, a preferred mud weight; and controlling a mud system to adjust a mud weight to the preferred mud weight.

In some implementations, performing the corrective action to avoid the potential drilling problem or mitigate the actual drilling problem involves displaying, via a graphical user interface (GUI), drilling instructions to perform one or more actions to avoid the potential drilling problem or mitigate the actual drilling problem.

In some implementations, performing the corrective action to avoid the potential drilling problem or mitigate the actual drilling problem involves: calculating, based on the formation pressure, a preferred kill mud amount to avoid the potential drilling problem or mitigate the actual drilling problem; and controlling a mud system to pump at least the preferred kill mud amount into the annulus.

In some implementations, the plurality of parameters further include: an original D-Exponent and an effective mud weight.

Figure 4:
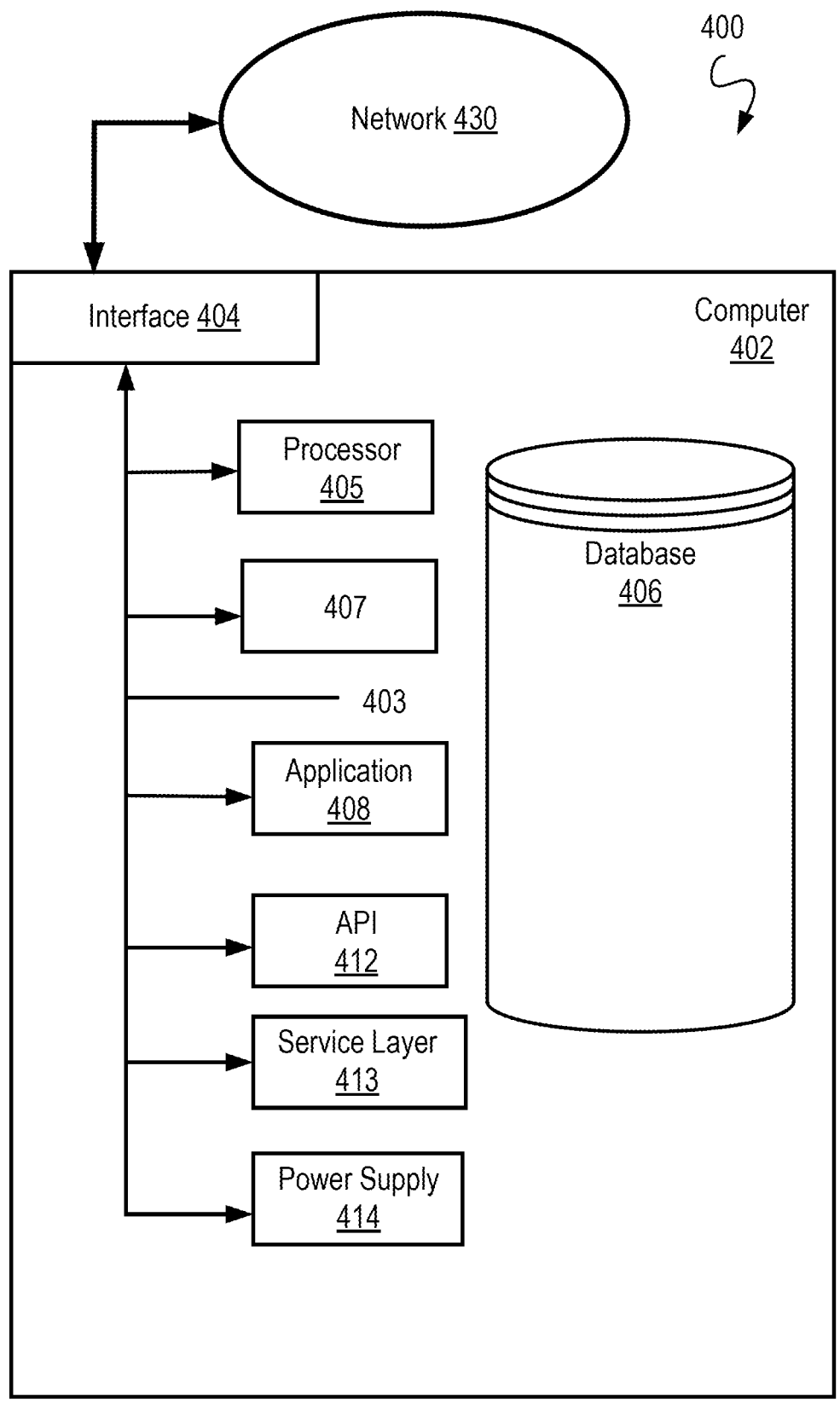
FIG. 4 illustrates an example computing environment for implementing the techniques described herein, according to some implementations of the present disclosure.

FIG. 4 is a block diagram of an example computer system 400 that can be used to provide computational functionalities associated with described algorithms, methods, functions, processes, flows, and procedures described in the present disclosure, according to some implementations of the present disclosure. In some implementations, the drilling control system 100 can be the computer system 400, include the computer system 400, or include part of the computer system 400. In some implementations, the drilling control system 100 can communicate with the computer system 400.

The illustrated computer 402 is intended to encompass any computing device such as a server, a desktop computer, embedded computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI). In some implementations, the inputs and outputs include display ports (such as DVI-I+2× display ports), USB 3.0, GbE ports, isolated DI/O, SATA-III (6.0 Gb/s) ports, mPCIe slots, a combination of these, or other ports. In instances of an edge gateway, the computer 402 can include a Smart Embedded Management Agent (SEMA), such as a built-in ADLINK SEMA 2.2, and a video sync technology, such as Quick Sync Video technology supported by ADLINK MSDK+. In some examples, the computer 402 can include the MXE-5400 Series processor-based fanless embedded computer by ADLINK, though the computer 402 can take other forms or include other components.

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both), over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs 412.

The service layer can provide software services to the computer 402 and other components (whether illustrated or not) that are communicably coupled to the computer 402. The functionality of the computer 402 can be accessible for all service consumers using this service layer. Software services, such as those provided by the service layer, can provide reusable, defined functionalities through a defined interface. For example, the interface can be software written in JAVA, C++, or a language providing data in extensible markup language (XML) format. While illustrated as an integrated component of the computer 402, in alternative implementations, the API or the service layer can be stand-alone components in relation to other components of the computer 402 and other components communicably coupled to the computer 402. Moreover, any or all parts of the API or the service layer can be implemented as child or sub-modules of another software module, enterprise application, or hardware module without departing from the scope of the present disclosure.

The computer 402 can include an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 can also include a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

An application 408 can be an algorithmic software engine providing functionality according to particular needs, desires, or particular implementations of the computer 402 and the described functionality. For example, an application 408 can serve as one or more components, modules, or applications 408. Multiple applications 408 can be implemented on the computer 402. Each application 408 can be internal or external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system including computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Figure 5:
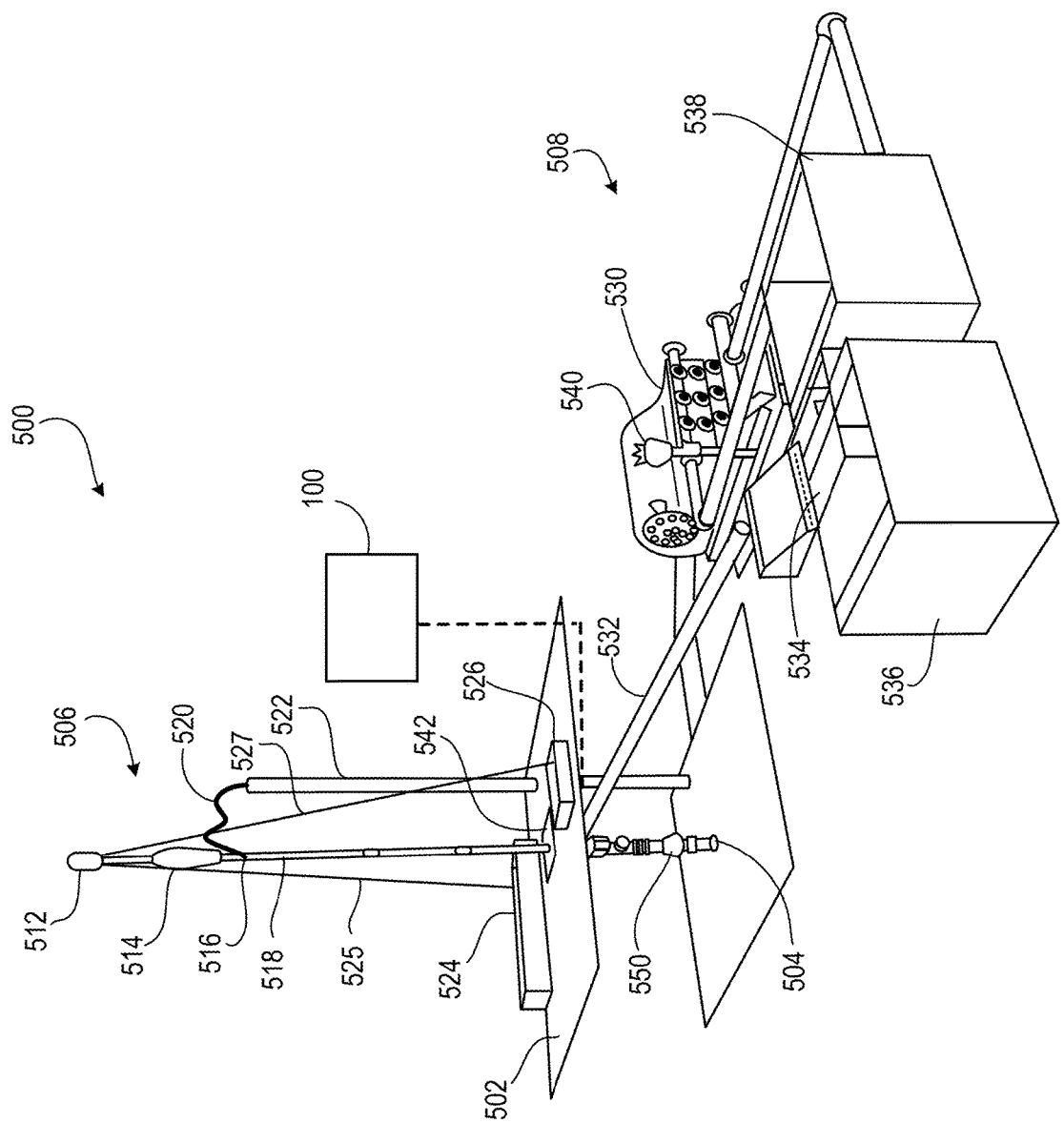
FIG. 5 is a partial schematic perspective view of an example rig system for drilling and producing a well, according to some implementations of the present disclosure.

FIG. 5 is a partial schematic perspective view of an example rig system 500 for drilling and producing a well. As shown in FIG. 5, the rig system 500 can communicate with the HCAS 100. The well can extend from the surface through the Earth to one or more subterranean zones of interest. The example rig system 500 includes a drill floor 502 positioned above the surface, a wellhead 504, a drill string assembly 506 supported by the rig structure, and a fluid circulation system 508 to filter used drilling fluid from the wellbore and provide clean drilling fluid to the drill string assembly 506. For example, the example rig system 500 of FIG. 5 is shown as a drill rig capable of performing a drilling operation with the rig system 500 supporting the drill string assembly 506 over a wellbore. The wellhead 504 can be used to support casing or other well components or equipment into the wellbore of the well.

The derrick or mast is a support framework mounted on the drill floor 502 and positioned over the wellbore to support the components of the drill string assembly 506 during drilling operations. A crown block 512 forms a longitudinally-fixed top of the derrick, and connects to a travelling block 514 with a drilling line including a set of wire ropes or cables. The crown block 512 and the travelling block 514 support the drill string assembly 506 via a swivel 516, a kelly 518, or a top drive system (not shown). Longitudinal movement of the travelling block 514 relative to the crown block 512 of the drill string assembly 506 acts to move the drill string assembly 506 longitudinally upward and downward. The swivel 516, connected to and hung by the travelling block 514 and a rotary hook, allows free rotation of the drill string assembly 506 and provides a connection to a kelly hose 520, which is a hose that flows drilling fluid from a drilling fluid supply of the circulation system 508 to the drill string assembly 506. A standpipe 522 mounted on the drill floor 502 guides at least a portion of the kelly hose 520 to a location proximate to the drill string assembly 506. The kelly 518 is a hexagonal device suspended from the swivel 516 and connected to a longitudinal top of the drill string assembly 506, and the kelly 518 turns with the drill string assembly 506 as the rotary table 542 of the drill string assembly turns.

In the example rig system 500 of FIG. 5, the drill string assembly 506 is made up of drill pipes with a drill bit (not shown) at a longitudinally bottom end of the drill string. The drill pipe can include hollow steel piping, and the drill bit can include cutting tools, such as blades, discs, rollers, cutters, or a combination of these, to cut into the formation and form the wellbore. The drill bit rotates and penetrates through rock formations below the surface under the combined effect of axial load and rotation of the drill string assembly 506. In some implementations, the kelly 518 and swivel 516 can be replaced by a top drive that allows the drill string assembly 506 to spin and drill. The wellhead assembly 504 can also include a drawworks 524 and a deadline anchor 526, where the drawworks 524 includes a winch that acts as a hoisting system to reel the drilling line in and out to raise and lower the drill string assembly 506 by a fast line 525. The deadline anchor 526 fixes the drilling line opposite the drawworks 524 by a deadline 527, and can measure the suspended load (or hook load) on the rotary hook. The weight on bit (WOB) can be measured when the drill bit is at the bottom the wellbore. The wellhead assembly 504 also includes a blowout preventer 550 positioned at the surface of the well and below (but often connected to) the drill floor 502. The blowout preventer 550 acts to prevent well blow-outs caused by formation fluid entering the wellbore, displacing drilling fluid, and flowing to the surface at a pressure greater than atmospheric pressure. The blowout preventer 550 can close around (and in some instances, through) the drill string assembly 506 and seal off the space between the drill string and the wellbore wall. The blowout preventer 550 is described in more detail later.

During a drilling operation of the well, the circulation system 508 circulates drilling fluid from the wellbore to the drill string assembly 506, filters used drilling fluid from the wellbore, and provides clean drilling fluid to the drill string assembly 506. The example circulation system 508 includes a fluid pump 530 that fluidly connects to and provides drilling fluid to drill string assembly 506 via the kelly hose 520 and the standpipe 522. The circulation system 508 also includes a flow-out line 532, a shale shaker 534, a settling pit 536, and a suction pit 538. In a drilling operation, the circulation system 508 pumps drilling fluid from the surface, through the drill string assembly 506, out the drill bit and back up the annulus of the wellbore, where the annulus is the space between the drill pipe and the formation or casing. The density of the drilling fluid is intended to be greater than the formation pressures to prevent formation fluids from entering the annulus and flowing to the surface and less than the mechanical strength of the formation, as a greater density may fracture the formation, thereby creating a path for the drilling fluids to go into the formation. Apart from well control, drilling fluids can also cool the drill bit and lift rock cuttings from the drilled formation up the annulus and to the surface to be filtered out and treated before it is pumped down the drill string assembly 506 again. The drilling fluid returns in the annulus with rock cuttings and flows out to the flow-out line 532, which connects to and provides the fluid to the shale shaker 534. The flow line is an inclined pipe that directs the drilling fluid from the annulus to the shale shaker 534. The shale shaker 534 includes a mesh-like surface to separate the coarse rock cuttings from the drilling fluid, and finer rock cuttings and drilling fluid then go through the settling pit 536 to the suction pit 536. The circulation system 508 includes a mud hopper 540 into which materials (for example, to provide dispersion, rapid hydration, and uniform mixing) can be introduced to the circulation system 508. The fluid pump 530 cycles the drilling fluid up the standpipe 522 through the swivel 516 and back into the drill string assembly 506 to go back into the well.

The example wellhead assembly 504 can take a variety of forms and include a number of different components. For example, the wellhead assembly 504 can include additional or different components than the example shown in FIG. 5. Similarly, the circulation system 508 can include additional or different components than the example shown in FIG. 5.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of the present disclosure have been described. Nevertheless, it will be understood that various modifications may be made without departing from the spirit and scope of the present disclosure. Accordingly, other embodiments are within the scope of the following claims.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

I claim:

1. A computer-implemented method, comprising:
receiving real-time drilling data of a drilling operation of drilling a wellbore in a formation, the drilling operation performed by a drilling system;
calculating, based on the real-time drilling data, a plurality of parameters of the drilling operation, the plurality of parameters comprising: an equivalent circulating density of a drilling fluid in the wellbore, a cuttings concentration in an annulus of the wellbore, and a corrected D-exponent;
calculating, based on the plurality of parameters, a formation pressure of the formation in which the drilling operation is performed, during an increase of a mud weight compared to a designed drilling mud weight;
based on the formation pressure, determining a corrective action to avoid a potential drilling problem or mitigate an actual drilling problem, the corrective action comprising an adjustment of the mud weight by modifying materials introduced in a circulation system; and
performing the corrective action to avoid the potential drilling problem or mitigate the actual drilling problem.

2. The computer-implemented method of claim 1, wherein performing the corrective action comprises:
detecting the potential drilling problem or the actual drilling problem based on the formation pressure.

3. The computer-implemented method of claim 2, wherein detecting the potential drilling problem or the actual drilling problem based on the formation pressure comprises:
calculating, based on the formation pressure, a mud level drop in the annulus; and
determining that the mud level drop is indicative of the potential drilling problem or the actual drilling problem.

4. The computer-implemented method of claim 1, wherein performing the corrective action to avoid the potential drilling problem or mitigate the actual drilling problem comprises:
controlling the drilling system to adjust one or more drilling parameters to avoid the potential drilling problem or mitigate the actual drilling problem.

5. The computer-implemented method of claim 4, wherein the drilling parameters comprise: a rate of penetration of a drilling tool of the drilling system, a hole size of the wellbore, and a flow rate of the drilling fluid.

6. The computer-implemented method of claim 1, wherein performing the corrective action to avoid the potential drilling problem or mitigate the actual drilling problem comprises:
calculating, based on the formation pressure, the designed drilling mud weight; and
controlling a mud system to adjust the mud weight to the designed drilling mud weight.

7. The computer-implemented method of claim 1, wherein performing the corrective action to avoid the potential drilling problem or mitigate the actual drilling problem comprises:
displaying, via a graphical user interface, drilling instructions to perform one or more actions to avoid the potential drilling problem or mitigate the actual drilling problem.

8. The computer-implemented method of claim 1, wherein performing the corrective action to avoid the potential drilling problem or mitigate the actual drilling problem comprises:
calculating, based on the formation pressure, a designed kill mud amount to avoid the potential drilling problem or mitigate the actual drilling problem; and
controlling a mud system to pump at least the designed kill mud amount into the annulus.

9. The computer-implemented method of claim 1, wherein the plurality of parameters further comprise: an original D-Exponent and an effective mud weight.

10. One or more non-transitory computer-readable storage media coupled to one or more processors and having instructions stored thereon which, when executed by the one or more processors, cause the one or more processors to perform operations comprising:
receiving real-time drilling data of a drilling operation of drilling a wellbore in a formation, the drilling operation performed by a drilling system;
calculating, based on the real-time drilling data, a plurality of parameters of the drilling operation, the plurality of parameters comprising: an equivalent circulating density of a drilling fluid in the wellbore, a cuttings concentration in an annulus of the wellbore, and a corrected D-exponent;
calculating, based on the plurality of parameters, a formation pressure of the formation in which the drilling operation is performed, during an increase of a mud weight compared to a designed drilling mud weight;
based on the formation pressure, determining a corrective action to avoid a potential drilling problem or mitigate an actual drilling problem, the corrective action comprising an adjustment of the mud weight by modifying materials introduced in a circulation system; and
causing performance of the corrective action to avoid the potential drilling problem or mitigate the actual drilling problem.

11. The one or more non-transitory computer-readable storage media of claim 10, wherein performing the corrective action comprises:
detecting the potential drilling problem or the actual drilling problem based on the formation pressure.

12. The one or more non-transitory computer-readable storage media of claim 11, wherein detecting the potential drilling problem or the actual drilling problem based on the formation pressure comprises:
calculating, based on the formation pressure, a mud level drop in the annulus; and
determining that the mud level drop is indicative of the potential drilling problem or the actual drilling problem.

13. The one or more non-transitory computer-readable storage media of claim 11, wherein performing the corrective action to avoid the potential drilling problem or mitigate the actual drilling problem comprises:
controlling the drilling system to adjust one or more drilling parameters to avoid the potential drilling problem or mitigate the detected drilling problem.

14. The one or more non-transitory computer-readable storage media of claim 13, wherein the drilling parameters comprise: a rate of penetration of a drilling tool of the drilling system, a hole size of the wellbore, and a flow rate of the drilling fluid.

15. The one or more non-transitory computer-readable storage media of claim 10, wherein performing the corrective action to avoid the potential drilling problem or mitigate the actual drilling problem comprises:
calculating, based on the formation pressure, the designed drilling mud weight; and controlling a mud system to adjust the mud weight to the designed drilling mud weight.

16. The one or more non-transitory computer-readable storage media of claim 10, wherein performing the corrective action to avoid the potential drilling problem or mitigate the actual drilling problem comprises:
displaying, via a graphical user interface, drilling instructions to perform one or more actions to avoid the potential drilling problem or mitigate the actual drilling problem.

17. The one or more non-transitory computer-readable storage media of claim 10, wherein performing the corrective action to avoid the potential drilling problem or mitigate the actual drilling problem comprises:
calculating, based on the formation pressure, a designed kill mud amount to avoid the potential drilling problem or mitigate the actual drilling problem; and
controlling a mud system to pump at least the designed kill mud amount into the annulus.

18. The one or more non-transitory computer-readable storage media of claim 10, wherein the plurality of parameters further comprise: an original D-Exponent and an effective mud weight.

19. A system comprising:
one or more processors configured to perform operations comprising:
receiving real-time drilling data of a drilling operation of drilling a wellbore in a formation, the drilling operation performed by a drilling system;
calculating, based on the real-time drilling data, a plurality of parameters of the drilling operation, the plurality of parameters comprising: an equivalent circulating density of a drilling fluid in the wellbore, a cuttings concentration in an annulus of the wellbore, and a corrected D-exponent;
calculating, based on the plurality of parameters, a formation pressure of the formation in which the drilling operation is performed, during an increase of a mud weight compared to a designed drilling mud weight;
based on the formation pressure, determining a corrective action to avoid a potential drilling problem or mitigate an actual drilling problem, the corrective action comprising an adjustment of the mud weight by modifying materials introduced in a circulation system; and
causing performance of the corrective action to avoid the potential drilling problem or mitigate the actual drilling problem.

20. The system of claim 19, wherein performing the corrective action comprises:
detecting the potential drilling problem or the actual drilling problem based on the formation pressure.

* * * * *